US010552840B2

(12) United States Patent
Smets et al.

(10) Patent No.: US 10,552,840 B2
(45) Date of Patent: Feb. 4, 2020

(54) SPEEDING UP CHIP TRANSACTION AT THE POINT OF SALE

(71) Applicant: MasterCard International Incorporated, Purchase, NY (US)

(72) Inventors: Patrik Smets, Nijlen (BE); Tim Stuart, Brussels (BE); Chirodeep Aikat, Lake St. Louis, MO (US); David Kenneth Meadon, Woking (GB); David Anthony Roberts, Warrington (GB)

(73) Assignee: Mastercard International Incorporated, Purchase, NY (US)

( * ) Notice: Subject to any disclaimer, the term of this patent is extended or adjusted under 35 U.S.C. 154(b) by 394 days.

(21) Appl. No.: 15/386,568

(22) Filed: Dec. 21, 2016

(65) Prior Publication Data

US 2017/0308899 A1    Oct. 26, 2017

Related U.S. Application Data

(60) Provisional application No. 62/327,782, filed on Apr. 26, 2016.

(51) Int. Cl.
*G06K 5/00* (2006.01)
*G06Q 20/40* (2012.01)
(Continued)

(52) U.S. Cl.
CPC .......... *G06Q 20/409* (2013.01); *G06Q 20/20* (2013.01); *G06Q 20/341* (2013.01); *G06Q 20/40* (2013.01);
(Continued)

(58) Field of Classification Search
CPC ...... G06Q 20/20; G06Q 20/40; G06Q 20/202; G06Q 20/409; G06Q 20/341;
(Continued)

(56) References Cited

U.S. PATENT DOCUMENTS 9,449,320 B1 *   9/2016  Walters ................. G06Q 20/40
2004/0230535 A1  11/2004 Binder et al.
(Continued)

FOREIGN PATENT DOCUMENTS

KR    10-2008-0072804 A    8/2008
WO    2007/038743 A2       4/2007

OTHER PUBLICATIONS

"PCT Notification of Transmittal of the International Search Report and the Written Opinion", of the International Searching Authority, or The Declaration, dated Jul. 13, 2017 (Jul. 13, 2017), for International Application No. PCT/US2017/029262, 11pgs.

*Primary Examiner* — Thien T Mai
(74) *Attorney, Agent, or Firm* — Buckley, Maschoff & Talwalkar LLC (57) ABSTRACT

A payment transaction is performed at a POS (point of sale) device. The device includes a terminal component and a reader component. The reader component includes a contact interface for establishing a data signal path via conductive contact with an integrated circuit (IC) payment card. A payment transaction is initiated. The data signal path is established between the reader component and the IC payment card. The IC payment card is commanded to generate a cryptogram for verification by an issuer of the card. The cryptogram is received from the card. In response to receiving the cryptogram, a command is issued to disable contact reading operation by the reader component.

25 Claims, 6 Drawing Sheets

(51) Int. Cl.
*G06Q 20/20* (2012.01)
*G06Q 20/34* (2012.01)
*G07F 7/08* (2006.01)

(52) U.S. Cl.
CPC ........... *G06Q 20/401* (2013.01); *G07F 7/088* (2013.01); *G06Q 2220/00* (2013.01)

(58) Field of Classification Search
CPC ............... G06Q 20/352; G06Q 20/354; G06Q 20/3552; G06Q 20/4016; G06Q 20/405; G06Q 20/3278; G06Q 20/353; G06Q 20/3829; G06Q 20/04; G06Q 20/10; G06Q 20/385; G06Q 10/04; G06Q 20/00; G06Q 20/14; G06Q 30/0215; G06Q 30/0226; G06Q 30/04; G06Q 40/12; G06Q 20/12; G06Q 20/204; G06Q 20/322; G06Q 20/3221; G06Q 20/3227; G06Q 20/3563; G06Q 20/3574; G06Q 20/36; G06Q 20/367; G06Q 20/3672; G06Q 20/382; G06Q 20/3823; G06Q 20/401; G06Q 2220/00; G01R 27/28
See application file for complete search history.

(56) References Cited

U.S. PATENT DOCUMENTS

| | | |
|---|---|---|
| 2010/0131413 A1 | 5/2010 | Kranzley et al. |
| 2010/0191649 A1 | 7/2010 | Albrecht et al. |
| 2017/0236125 A1* | 8/2017 | Guise .................. G06Q 20/204 705/17 |

* cited by examiner

SPEEDING UP CHIP TRANSACTION AT THE POINT OF SALE

CROSS REFERENCE TO RELATED APPLICATION

This application claims the benefit of U.S. Provisional Patent Application No. 62/327,782 filed on Apr. 26, 2016, the contents of which are hereby incorporated by reference for all purposes.

BACKGROUND

Figure 1:
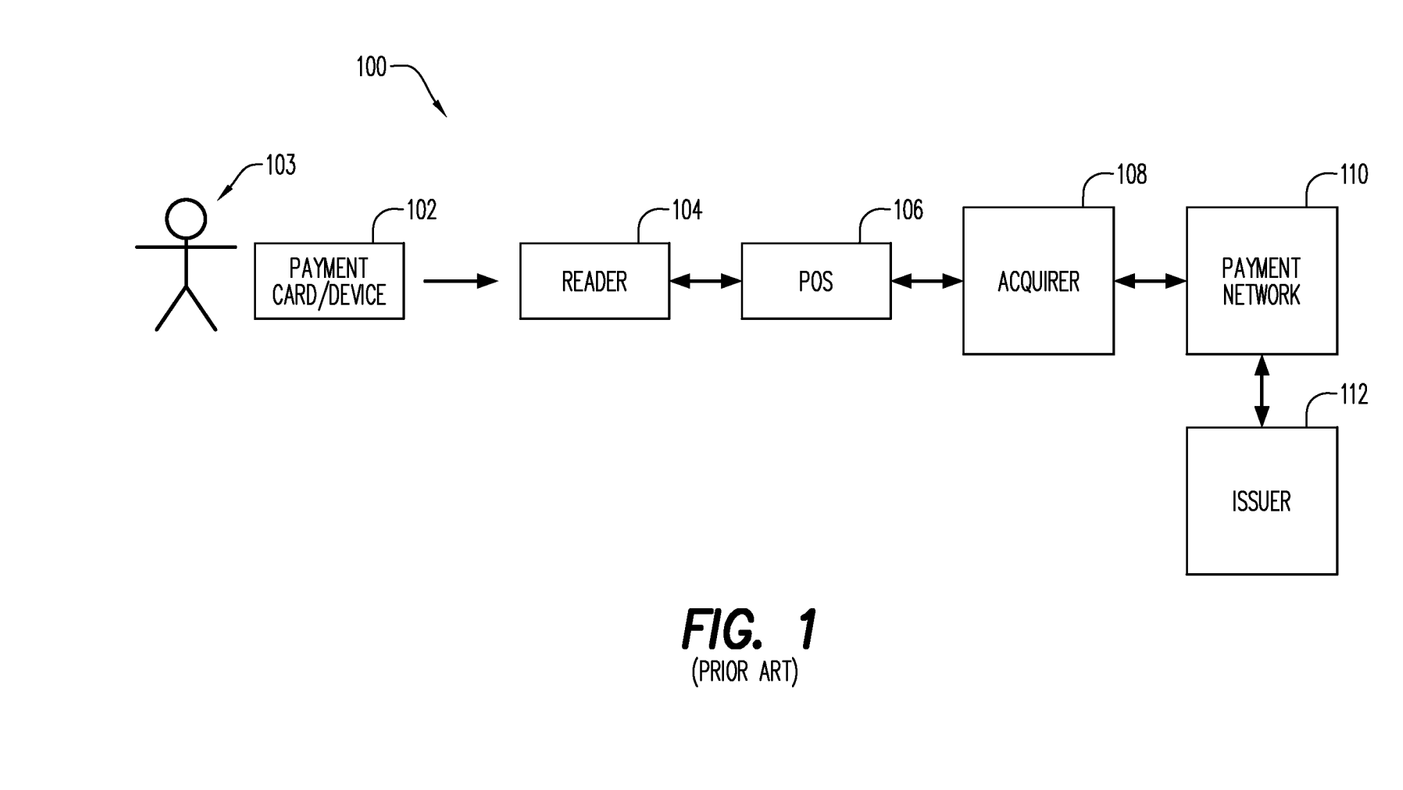
FIG. 1 is a block diagram that illustrates a conventional payment system.

FIG. 1 is a block diagram that illustrates a conventional payment system 100.

The system 100 includes a conventional payment card/device 102. As is familiar to those who are skilled in the art, the payment card/device 102 may be a magnetic stripe card, an IC (integrated circuit) card, a fob, a payment-enabled smartphone, etc. The payment card/device 102 is shown being carried and used by an account holder/user 103.

The system 100 further includes a reader component 104 associated with a POS terminal 106. In some known manner (depending on the type of the payment card/device 102) the reader component 104 is capable of reading the payment account number and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment account issuer server computer 112 may be operated by or on behalf of a financial institution ("FI") that issues payment accounts to individual users. For example, the payment account issuer server computer 112 may perform such functions as (a) receiving and responding to requests for authorization of payment account transactions to be charged to payment accounts issued by the FI; (b) tracking and storing transactions and maintaining account records; (c) rendering periodic account statements; (d) receiving and tracking payments to the issuer from the account holders; and (e) clearing transactions.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their POS terminals and associated reader components. The system may also include a very large number of payment account holders, who carry payment cards or other devices for initiating payment transactions by presenting an associated payment account number to the reader component of a POS terminal.

In an important market for payment account transactions, a significant shift is now taking place in terms of the actions taken at the point of sale in connection with a typical payment account transaction. In this market, until fairly recently, most account holders carried magnetic stripe payment cards and most merchants permitted their customers to load the account information and so forth into the point of sale card reader 104 via swiping the magnetic stripe of the payment card through a magnetic stripe reader (not separately shown in FIG. 1) that was part of the reader 104. However, in an initiative to combat payment account fraud and deter counterfeiting of payment cards, new arrangements among the parties to payment account transactions have arisen, such that magnetic stripe "swipe" transactions are no longer encouraged. Instead, card issuers are generally issuing payment cards that are IC cards and that have electrically conductive contact pads on the front surface of the cards. Via these contact pads, a "contact interface" on the reader 104 allows for exchange of data communications between the POS terminal 106 and the integrated circuit in the contact IC payment card. The exchange of data communications between the POS terminal 106 and the IC card typically follows a standard protocol for such exchanges of data. As the above-noted shift takes place, chip-card contact reading is increasingly occurring at the point of sale rather than a magnetic stripe "swipe."

One issue that has arisen is that these contact or "chip" transactions at the point of sale either consume more time than the previously prevailing "swipe" transactions, or at least are perceived to take more time. It is of course in the interest of both card holders and merchants that point of sale transactions be completed (and are perceived to be completed) promptly.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a POS device issues a command to a contact IC payment card interfaced thereto to cause the payment card to generate a transaction cryptogram according (for example) to a known transaction protocol standard. Upon receiving the cryptogram from the IC card, the POS device deactivates a card reader component of the POS device, while prompting the card holder to remove the IC card from the reader component. While the card is being removed and/or after removal of the card, the POS device includes the transaction cryptogram in a transaction authorization request message that is routed to the issuer of the card. An authorization response message originating from the card issuer is returned to the POS device to trigger completion of the transaction at the point of sale.

By overlapping removal of the IC card with the authorization request/authorization response cycle (or with continued scanning of purchased items), the transaction is speeded up and greater efficiency and an improved user experience are provided at the point of sale.

Figure 2:
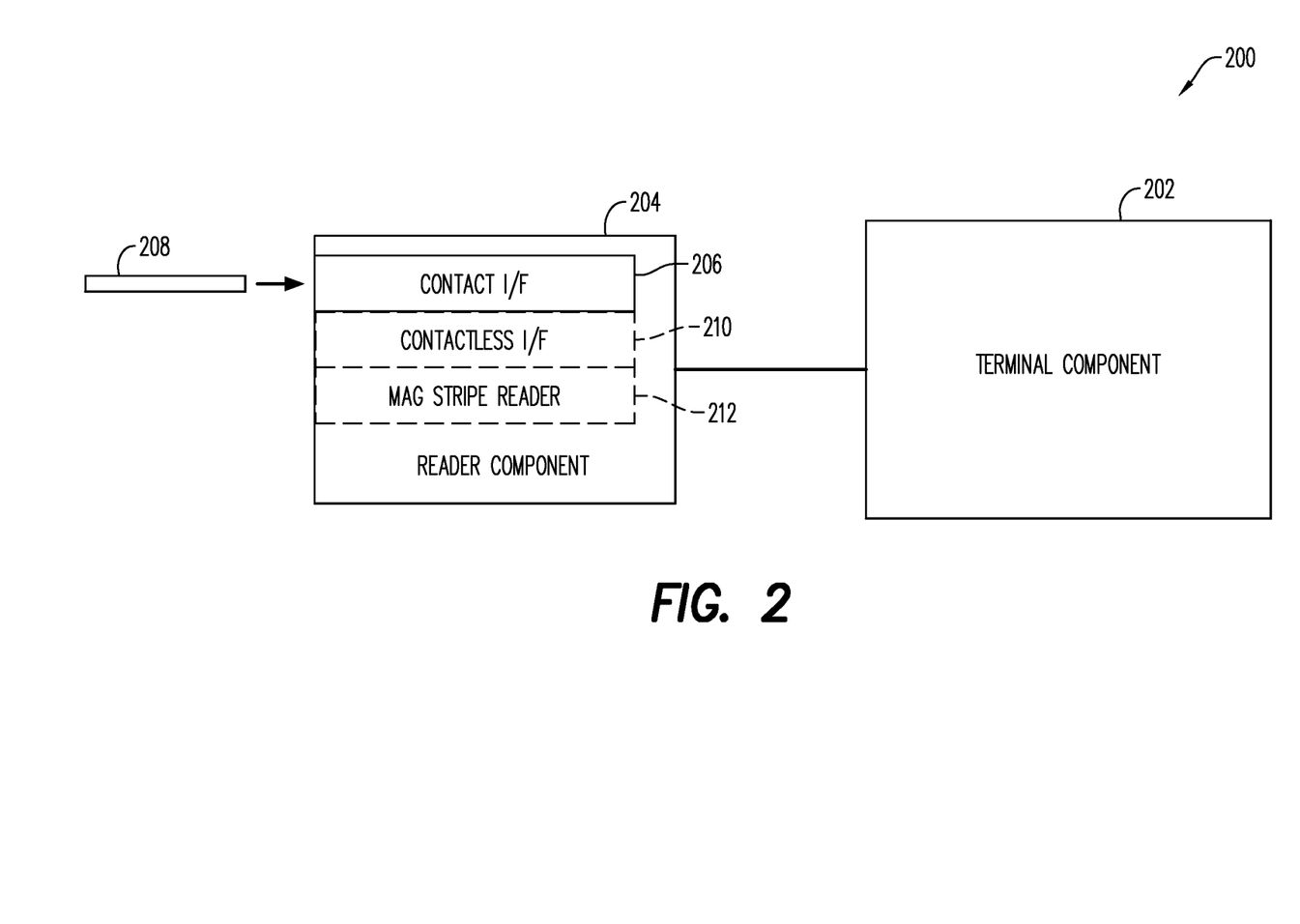
FIGS. 2 and 3 are block diagrams that illustrate aspects of a point of sale (POS) device provided in accordance with teachings of the present disclosure.
Figure 3:
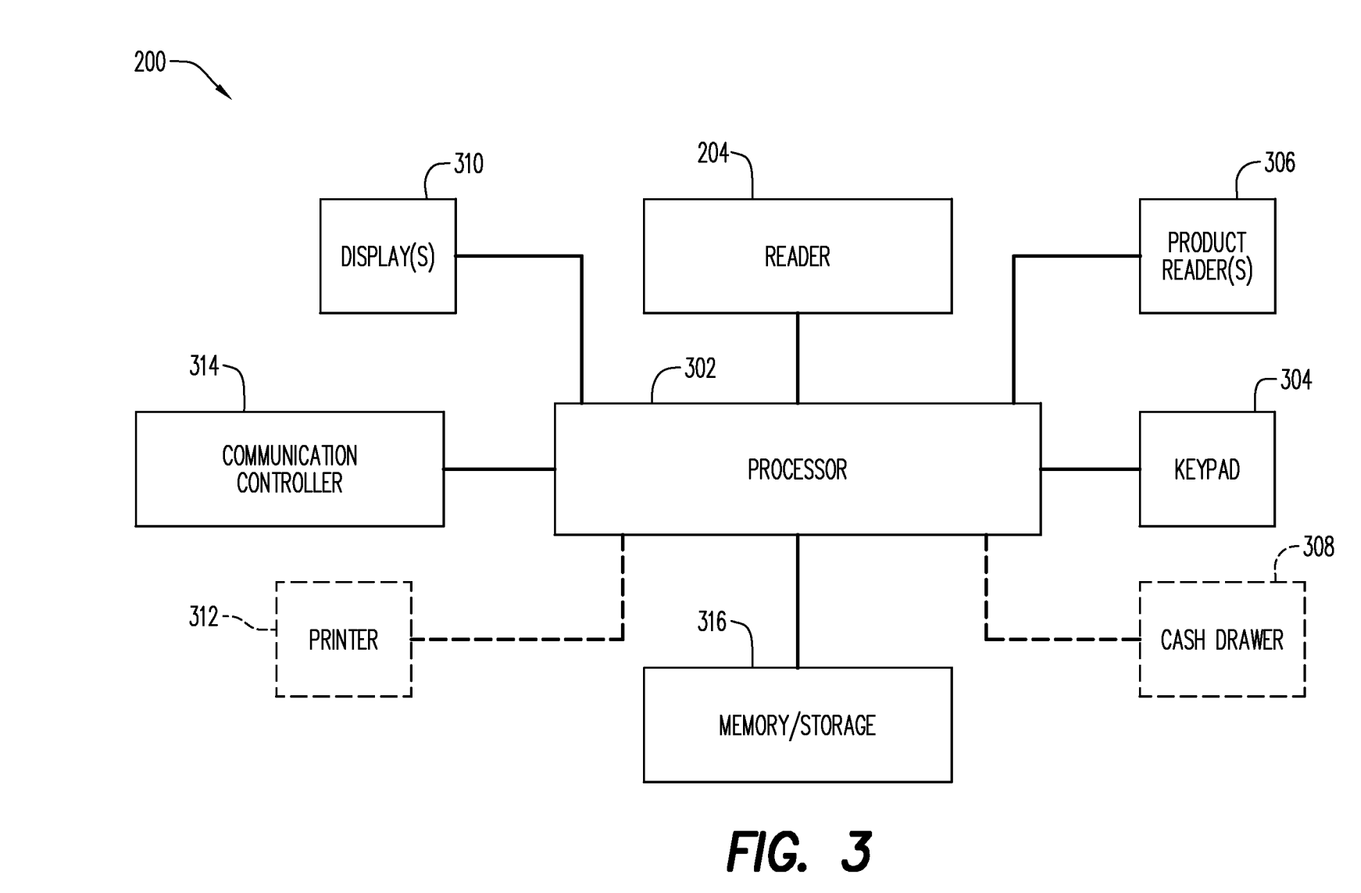

FIGS. 2 and 3 are block diagrams that illustrate aspects of a point of sale (POS) device 200 provided in accordance with teachings of the present disclosure. In its hardware aspects, the POS device 200 need not differ from conventional POS devices. However, as will be seen, the POS device 200 may be programmed to handle "contact" or "chip" transactions in accordance with aspects of the present disclosure to provide functionality as described herein. The POS device 200, while provided and operative in accordance with aspects of the present disclosure, may take the place of the elements 104 and 106 in the payment system 100, and thus may be a portion of a payment system that is substantially conventional apart from the aspects of the POS device 200 as described herein.

As seen from FIG. 2, the POS device 200 may include a terminal component 202 and a reader component 204. The reader component 204 may be operatively coupled to the terminal component. In some embodiments the components 202 and 204 each reside in respective housings (not separately shown) although alternatively both components may share a common housing (not separately shown). The reader component 204 includes a contact interface 206. In a conventional manner, the contact interface may be configured to engage contact pads (not shown) on a contact IC payment card (indicated at 208 in FIG. 2). It may frequently be the case that the reader component 204 may also include a contactless interface 210 and a magnetic stripe reader 212. Both of the latter elements are familiar to those who are skilled in the art.

Turning now to FIG. 3, other aspects of the POS device 200 will now be described.

The POS device 200 may include a processing element (or elements) such as the processor 302 shown in FIG. 3. The processor 302 may, for example, be a conventional microprocessor, and may operate to control the overall functioning of the POS device 200.

The POS device 200 may also include conventional peripheral components, in communication with and/or controlled by the processor 302, such as: (a) a keypad/touchscreen 304 for receiving input from the human operator of the POS terminal; (b) a product reader 306 for reading any form of unique product identifier, such as a barcode or RFID, that appears on, or is attached to, products brought to the terminal for purchase; (c) a cash drawer 308 for storing cash received from customers; (d) one or more displays 310 for providing output (e.g., identifying products presented for purchase and their prices, indicating sales tax due, indicating transaction subtotals and totals, etc., displaying prompts to the customer and/or to the sales associate); (e) a printer 312 for printing out sales receipts; and (f) a communication controller 314 for allowing the processor 302, and hence, the POS device 200 to engage in communication over data networks with other devices (e.g., to exchange messaging with payment account issuers, as described above in connection with FIG. 1). (In some embodiments, at least one of the displays 310 may be a touch screen, so as to provide an input function as well as an output function.)

In addition, the POS device 200 may include one or more memory and/or data storage devices (indicated collectively at 316), which may comprise any combination of one or more of a hard disk drive, RAM (random access memory), ROM (read only memory), flash memory, etc. The memory/data storage device(s) 316 may store software and/or firmware that programs the processor 302 and the POS device 200 to perform functionality as described herein. Thus the memory/data storage device(s) 316 may be in communication with the processor 302. Further, the POS device 200 may include one or more housings (not shown) which contain and/or support one or more of the other components shown in FIG. 3.

In accordance with known practices, the memory 316 may store one or more software "kernels" that program the processor 302 such that the POS device 200 is enabled to engage in a communications with an IC payment card presented thereto in accordance with one or more standard communication protocols. One example of such kernels would be an EMV kernel certified in accordance with the requirements of the EMVCo.

In some embodiments, each of the terminal component 202 and the reader component 204 may be controlled by a respective processor, with each processor programmed by firmware and/or software stored in a respective memory. In cases where the reader component 204 is controlled by its own processor, that processor may be programmed with one or more software kernels as referred to above.

Figure 4:
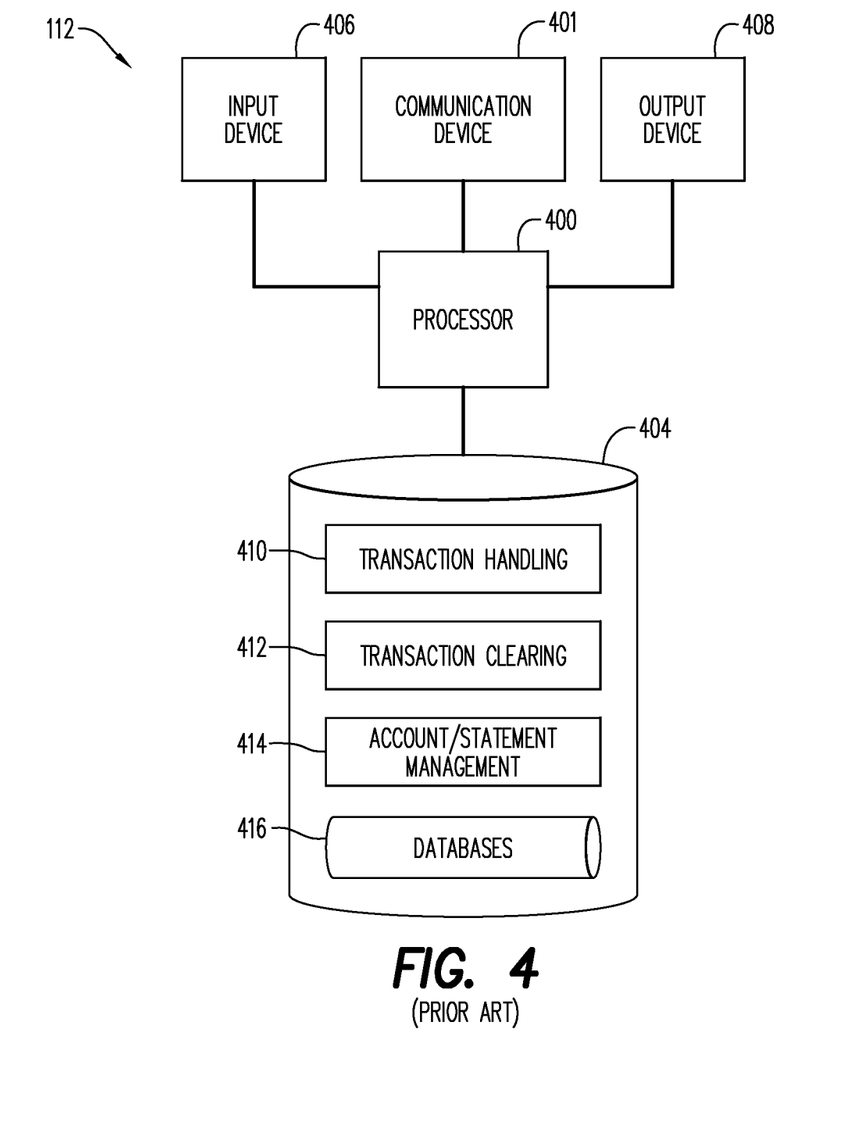
FIG. 4 is a block diagram that illustrates a conventional payment account issuer computer that may be part of the system of FIG. 1 and that may exchange messaging with the POS device of FIGS. 2 and 3.

FIG. 4 is a block diagram that illustrates an example embodiment of the issuer server computer 112 as shown in FIG. 1. The issuer server computer 112 may be provided in accordance with conventional practices. For example, the issuer server computer 112 may be conventional in its hardware aspects. In some embodiments, the issuer server computer 112 may be constituted by conventional server computer hardware.

The issuer server computer 112 may include a computer processor 400 operatively coupled to a communication device 401, a storage device 404, an input device 406 and an output device 408. The communication device 401, the storage device 404, the input device 406 and the output device 408 may all be in communication with the processor 400.

The computer processor 400 may be constituted by one or more conventional processors. Processor 400 operates to execute processor-executable steps, contained in program instructions described below, so as to control the issuer server computer 112 to provide desired functionality.

Communication device 401 may be used to facilitate communication with, for example, other devices (such as one or more computers operated by the payment network 110, the acquirer computer 108 and/or for exchanging transaction messaging with numerous POS devices such as the POS device 200). The communication device 401 may comprise numerous communication ports (not separately shown), to allow the issuer server computer 112 to communicate simultaneously with other devices, including communications as required to simultaneously handle numerous payment transactions.

Input device 406 may comprise one or more of any type of peripheral device typically used to input data into a computer. For example, the input device 406 may include a keyboard and a mouse. Output device 408 may comprise, for example, a display and/or a printer.

Storage device 404 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 404 stores one or more programs for controlling processor 400. The programs comprise program instructions (which may be referred to as computer readable program code means) that contain processor-executable process steps of the issuer server computer 112, executed by the processor 400 to cause the issuer server computer 112 to perform its roles in the payment system 100 (FIG. 1).

Continuing to refer to FIG. 4, the programs stored in the storage device 404 may include one or more conventional operating systems (not shown) that control the processor 400 so as to manage and coordinate activities and sharing of resources in the issuer server computer 112, and to serve as a host for application programs (described below) that run on the issuer server computer 112.

The programs stored in the storage device 404 may also include a transaction handling application program 410 that controls the processor 400 to enable the POS device 200 to handle and respond to transaction authorization request messages.

The storage device 404 may also store a transaction clearing application program 412 to enable the issuer server computer 112 to perform its role in connection with clearing of payment account transactions.

In addition, the storage device 404 may store an account and statement management application program 414 to enable the issuer server computer 112 to perform its roles in connection with maintain and providing periodic statements regarding payment accounts issued to account holders.

The storage device 404 may also store, and the issuer server computer 112 may also execute, other programs, which are not shown. For example, such programs may include a reporting application, which may respond to requests from system administrators for reports on the activities performed by the issuer server computer 112. The other programs may also include, e.g., one or more data communication programs, device drivers, database management software, etc.

The storage device 404 may also store one or more databases 416 required for operation of the issuer server computer 112.

Figure 5:
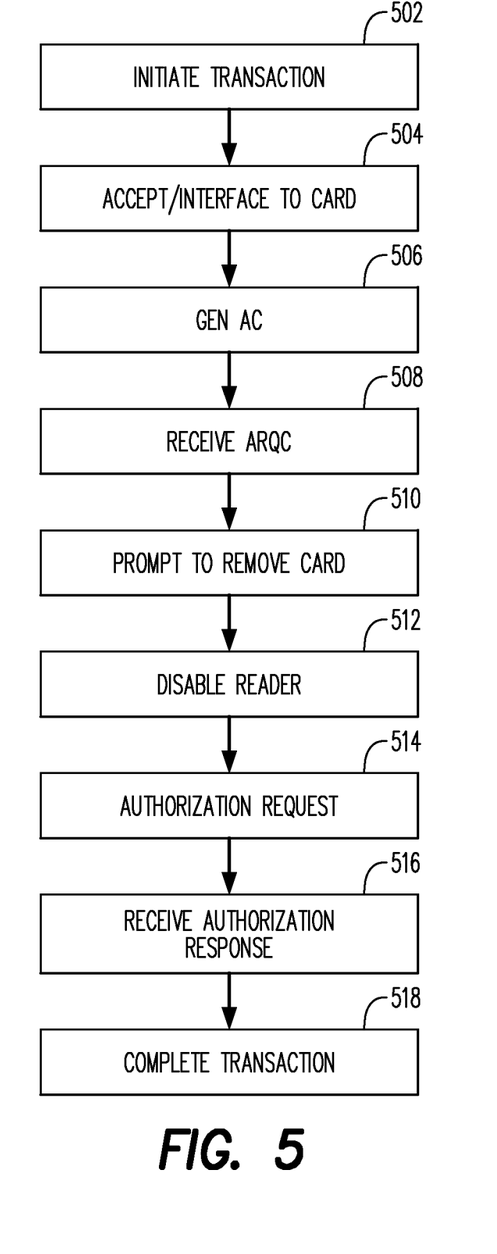
FIGS. 5 and 6 are flow charts that respectively illustrate example transaction processes that may be performed by the POS device of FIGS. 2 and 3 in accordance with teachings of the present disclosure.

FIG. 5 is a flow chart that illustrates an example transaction process that may be performed by the POS device 200 of FIGS. 2 and 3 in accordance with teachings of the present disclosure.

At 502 in FIG. 5, the POS device 200 may initiate a transaction. For example, the user 103 (FIG. 1) may have brought one or more items to a checkout counter in a retail store, and the POS device 200 (located at the checkout counter) may have commenced scanning the selected items. At the same time, the POS device 200 may (a) activate the reader component 202 (the terminal component may issue a command accordingly); and display a prompt to the user 103 to insert his/her contact IC payment card for reading by the reader component 204 (FIG. 2).

At 504, the reader component 204, via its contact interface 206, may receive the payment card 208 in such a manner that an electrically conductive data signal path is established between the POS device 200 and the IC (not separately shown) in the payment card 208.

There are then further process steps that occur which are standard in the EMV context that are not of particular relevance to the teachings of the present disclosure. These process steps may include: (A) application selection; (B) transaction initiation; (C) reading of card data; and (D) offline data authentication (authentication of the card by the terminal). The process steps may also include cardholder verification through the Verify command.

At 506, the terminal component 202 may issue a "Gen AC" command (i.e., in this situation, in accordance with the EMV standard protocol). According to this command, the payment card 208 is directed to generate a transaction cryptogram. In connection with the issuance of this command, the terminal component may supply a place holder transaction amount, in view of the fact that scanning of purchased items and other aspects of obtaining a total transaction amount may be ongoing at the time the Gen AC command is issued. The place holder transaction amount may be a standard nonzero value that the terminal provides at this stage in connection with every transaction. The place holder transaction amount may be above the "floor limit" below which transactions are not sent online. The place holder transaction amount may be below a limit established for a so-called "quick payment service" (QPS) if it is desired that the transaction qualify for handling under such a service and be exempt from cardholder verification. (In some embodiments, the place holder transaction amount need not be above the "floor limit" if the terminal component 202 employs a mechanism to ensure that the reader component 204 routinely requests an online cryptogram from the payment card 208.) In some embodiments, the place holder transaction amount is above a CVM (cardholder verification method) limit so that a CVM is always required. Advantageously, either or both of the reader component 204 and the terminal component 202 (as the case may be) may refrain from displaying the place holder amount to the user 103, so that confusion does not result on the part of the user 103.

At 508, the POS device 200 receives the requested cryptogram from the payment card 208. It may be assumed that the cryptogram is an ARQC (Authorization Request Cryptogram), generated by the payment card 208 in accordance with the EMV standard protocol. In addition to being based on the place holder transaction amount, the payment card generation of the transaction cryptogram may be based on conventional inputs, such as a currency code, an unpredictable number provided to the payment card 208 from the terminal component 202, an application transaction counter value as currently stored in the payment card 208, discretionary data from the card, card verification results, terminal verification results, transaction context data, and so forth. Such of this data that is not supplied by the terminal component 202, may be transmitted to the terminal component 202 from the payment card 208 (and via the reader component 204) along with the transaction cryptogram.

In embodiments where CVM is to be performed, this may occur prior to the payment card 208 generating the transaction cryptogram. In some embodiments, the CVM may entail the user 103 entering a PIN (personal identification number) and verification of the PIN.

At 510, and in response to receiving the transaction cryptogram at 508, the POS device 200 prompts the user 103 to remove his/her payment card 208 from the reader component 204. This may be handled by the terminal component 202 if the terminal component 202 manages displays of prompts to the user, or may be handled by the reader component 204 if the reader component 204 manages displays of prompts to the user. The prompt may include a beeping sound or other audible component in addition to a visual display or cue that the user is to remove the card. It is also to be noted that this prompt to the user may occur even though the POS device 200 has not yet received authorization for the transaction vis a vis the card issuer 112 (FIG. 1). With this prompting of the user to remove the payment card, the user's time of involvement in the transaction may be shortened, as the user may respond by removing his/her card and replacing it in his/her wallet, while other aspects of the transaction continue and are completed, thereby potentially improving throughput at the point of sale and/or the user's perception of how long it took to accomplish the transaction.

At 512, and also in response to receiving the transaction cryptogram at 508, the terminal component 202 may take an action that deactivates further operation relative to the payment card 208 for this transaction by the reader component 204. In some embodiments, this may involve issuing a command that deactivates the contact interface 206 of the reader component 204. (Such a command may, for example, correspond to a command of this type that may be available in connection with operating/managing the contactless interface 210 (if present, see FIG. 2) of the reader component 204.) Alternatively, the terminal's deactivation of the transaction-related operation of the reader component 204 may involve deactivation of the software kernel for controlling transaction-related processing by the reader component 204.

It is to be noted that this process step 512 may occur within a very short time or even virtually simultaneously with the prompt to the user as described above in connection with block 510.

At 514, the POS device 200 may generate a payment transaction authorization request message for transmission from the POS device 200 and routing to the card issuer 112. The payment transaction authorization request message may include the transaction cryptogram received at 508. The payment transaction authorization request message may also include all data required for the card issuer to verify the transaction cryptogram. Such data includes the place holder transaction value that was one of the data elements utilized by the payment card 208 in generating the transaction cryptogram. Moreover, the payment transaction authorization request message may include the actual transaction total amount that is to be used for financial purposes with respect to the transaction. The place holder transaction amount—to be used for verification of the transaction cryptogram—and the actual transaction amount—to be used for financial purposes—may be carried in the payment transaction authorization request message in different respective data elements in a standard format for the payment transaction authorization request message. The financial purposes may include the card issuer's determination as to whether the user's account has sufficient funds or credit for the transaction to be approved, as well as an indication of the amount to be charged for the transaction to the user's payment account.

Since the payment transaction authorization request message includes the actual transaction amount, it will be appreciated that this step (block 514) may not take place until all of the purchased items have been scanned and the POS device 200 has calculated the transaction total for the current transaction. If that process has occurred relatively rapidly, this step (block 514) may be performed at about the same time that steps 510 and 512 are performed. If there are a considerable number of items to be scanned, then block 514 may occur sometime after blocks 510 and 512.

At 516, the POS device 200 receives the payment transaction authorization response message. As will be understood by those who are skilled in the art, the payment transaction authorization response message was generated by the card issuer 112 in response to the payment transaction authorization request message generated and transmitted by the POS device at 514. The transaction authorization response message may include so-called chip data for the card. Assuming the payment transaction authorization response message indicates approval of the transaction, the transaction at the point of sale may then be completed (block 518), including displaying a message to the user to indicate approval of the transaction, printing and handing a paper receipt to the user/customer 103 and permitting the user 103 to depart with the purchased items.

In view of the removal of the card at or in response to block 510, and deactivation of the reader component 204 at block 512, the terminal component 202 may refrain from forwarding to the reader component 204 any so-called chip data included in the payment transaction authorization response message. The terminal component 202 may simply disregard such chip data. Also, the terminal component 202 should refrain from prompting the user 103 to re-insert the payment card 208 for the purpose of delivering chip data to the payment card 208. The measures/non-actions described in this paragraph are in line with teachings of this disclosure related to streamlining and speeding up contact-chip-card transactions at the point of sale.

To facilitate the point of sale transaction process as described above in connection with FIG. 5, it may be desirable that the acquirer 108 not be configured to routinely reject transactions that include two ostensible transaction amounts, namely the place holder amount and the actual transaction amount, as discussed above in connection with FIG. 5. Moreover, it would be advantageous for the card issuer 112 also to be so configured, and further configured to parse the payment transaction authorization request message to obtain both the place holder amount for purposes of verifying the transaction cryptogram and the actual transaction amount to be used for financial purposes. The features of the acquirer 108 and the card issuer 112 described in this paragraph may represent modifications of the conventional acquirer and/or issuer computers depicted in FIG. 1 and/or FIG. 4.

In cases where the reader component 204 receives an AAC (Application Authentication Cryptogram) rather than an ARQC from the card, the reader component 204 may inform the terminal component 202 and may display a notification to the user 103 that the transaction is declined.

Figure 6:
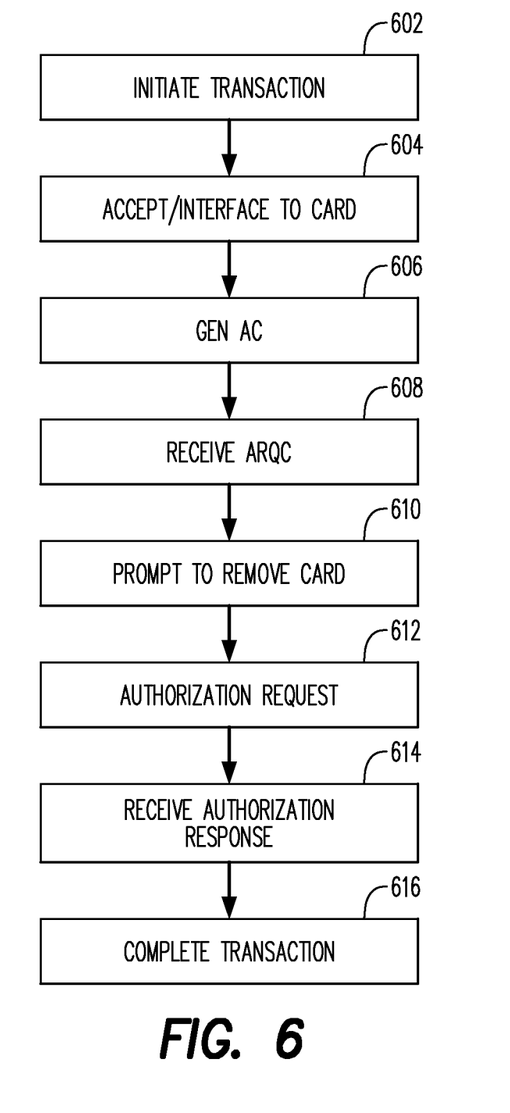

FIG. 6 is a flow chart that illustrates an alternative example transaction process that may be performed by the POS device 200 of FIGS. 2 and 3 in accordance with teachings of the present disclosure if the card would still be present in the reader or if the reader reverts to exception processing when the card has been removed.

The process of FIG. 6 resembles the process of FIG. 5, except that the process step 510 shown in FIG. 5 is omitted from the process of FIG. 6. Thus, blocks 602, 604, 606 and 608 in FIG. 6 may correspond in substance, respectively, to blocks 502, 504, 506 and 508 of FIG. 5, as described above.

Moreover, blocks 610, 612, 614 and 616 in FIG. 6 may correspond in substance, respectively, to blocks 512, 514, 516 and 518 of FIG. 5, as described above.

When the user 103 is prompted at block 610 (FIG. 6), to remove the card, and if he/she does so promptly, this may cause the reader component 204 to deem that the transaction has "crashed", and revert to exception processing and terminate the transaction. However, the point of view of the reader component 204 in this situation may be of no moment to the terminal component 202, which may go on scanning purchased items (if there are more to scan), generating and transmitting the payment transaction authorization request message, receiving the payment transaction authorization response message and completing the transaction, all without further involvement of the reader component 204, at least as to interaction with the payment card 208. At the end of the current transaction, the reader component 204 may be reset so as to be ready for the next transaction.

In some embodiments, in a case where the user 103 does not quickly remove the card and/or the messaging between the terminal component 202 and the card issuer 112 is completed rapidly, the normal transaction may complete from the point of view of the reader component 204, including a second Gen AC command to the card, and confirmation of verification of the issuer by the card.

By prompting the user to remove the card (block 610, FIG. 6) from the reader component 204 in response to receipt by the POS device 200 of the ARQC generated by the card, the processing of FIG. 6 may provide essentially the same benefits as the FIG. 5 process, in terms of speeding up the POS transaction and/or improving the user's perception of the length of time required for the transaction.

According to another variation on the processes described above, the first part of the transaction is performed up to and including PIN entry as soon as possible (and offline PIN verification if supported), but the card is left in the reader until the issuer response is available. This optimizes the overall time as much as possible from the merchant point of view, but it is still possible for the issuer to deliver messages to the card.

According to yet another variation, the authorization may be requested from the issuer for a maximum amount (analogous to a pre-authorization for a pre-set dollar amount typically requested at a fuel pump in the United States), and then a post transaction correction follows during clearing. In a single message system with this approach, a second message may be issued to correct the transaction amount as authorized.

According to still another variation, (online) PIN entry may be deferred until the final amount is known. This would enable the user/cardholder to dispute the transaction before entering the PIN if the user happens to disagree with the amount.

According to other variations, a number of features of the above scenarios may be combined. E.g., the card can be inserted while the goods are being scanned (i.e., before the final amount is known). If required, the PIN can be entered and then the card removed, to reduce the time that the card needs to be in the reader. The transaction can be authorized online while scanning of the goods continues, to reduce the overall transaction time. As suggested above, once the final transaction amount is known, the first authorization can be adjusted through clearing, or a final authorization may occur without the user/cardholder being involved.

Although transaction processes set forth herein have mainly been described in the context of an EMV transaction, the teachings of this disclosure are not limited to that context but rather may be applied more generally to contact chip card transactions at the point of sale.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable including simultaneous performance of at least some steps.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method of performing a payment transaction at a POS (point of sale) device that includes a terminal component and a reader component, the terminal component operatively coupled to the reader component, the reader component including a contact interface for establishing a data signal path via conductive contact with an integrated circuit (IC) payment card, the method comprising:

initiating said payment transaction;

establishing said data signal path between said reader component and said IC payment card;

commanding the IC payment card to generate a cryptogram for verification by an issuer of the IC payment card prior to a final transaction amount being known, said commanding including supplying a place holder transaction amount to the IC payment card, the place holder transaction amount for being used in generating the cryptogram;

receiving the cryptogram from the IC payment card;

in response to receiving the cryptogram, issuing a command to disable contact reading operation by the reader component;

transmitting a transaction authorization request, the transaction authorization request including (a) the cryptogram, (b) the place holder transaction amount, and (c) the final transaction amount; and after issuing said command to disable, receiving a transaction authorization response message approving said payment transaction.

2. The method of claim 1, wherein said commanding step includes providing a placeholder amount in place of the final transaction amount.

3. The method of claim 2, wherein the placeholder amount is set at a value consistent with online authorization of the payment transaction.

4. The method of claim 3, wherein the placeholder amount is set at a value consistent with by-passing cardholder verification.

5. The method of claim 3, wherein the placeholder amount is set at a value consistent with requesting cardholder verification.

6. The method of claim 2, wherein said command issued in response to receiving the cryptogram is a command to deactivate the contact interface of the reader component.

7. The method of claim 2, wherein said command issued in response to receiving the cryptogram is a command to deactivate a card-reading software kernel associated with the POS device.

8. The method of claim 2, further comprising:
in response to receiving the cryptogram, displaying a prompt to a user instructing the user to remove the IC payment card from the reader component.

9. The method of claim 8, wherein said displaying is controlled by the terminal component.

10. The method of claim 8, wherein said displaying is controlled by the reader component.

11. The method of claim 8, further comprising:
generating a payment transaction authorization request message, said payment transaction authorization request message including said cryptogram; and
transmitting said payment transaction authorization request message for routing to said issuer, said payment transaction authorization request message including both the final transaction amount and the placeholder amount.

12. The method of claim 8, further comprising:
generating a payment transaction authorization request message, said payment transaction authorization request message including said cryptogram;
transmitting said payment transaction authorization request message for routing to said issuer, said payment transaction authorization request message including the placeholder amount and not the final transaction amount; and
transmitting an additional message for routing to the issuer, said second message indicating that the final transaction amount and not the placeholder amount is a correct transaction amount for the payment transaction.

13. The method of claim 12, further comprising:
receiving a response to said payment transaction authorization request message, said response originating from said issuer, said receiving of said response occurring after said displaying of said prompt, said response including chip data; and
refraining from transmitting the chip data to the IC payment card.

14. A method of performing a payment transaction at a POS (point of sale) device that includes a terminal component and a reader component, the terminal component operatively coupled to the reader component, the reader component including a contact interface for establishing a data signal path via conductive contact with an integrated circuit (IC) payment card, the method comprising:
initiating said payment transaction;
establishing said data signal path between said reader component and said IC payment card;
commanding the IC payment card to generate a cryptogram for verification by an issuer of the IC payment card, said commanding including supplying a place holder transaction amount to the IC payment card, the place holder transaction amount for being used in generating the cryptogram;
receiving the cryptogram from the IC payment card;
in response to receiving the cryptogram, displaying a prompt to a user instructing the user to remove the IC payment card from the reader component;
transmitting a transaction authorization request, the transaction authorization request including (a) the cryptogram, (b) the place holder transaction amount, and (c) a final transaction amount; and
after displaying said prompt, receiving a transaction authorization response message approving said payment transaction.

15. The method of claim 14, wherein said displaying is controlled by the terminal component.

16. The method of claim 14, further comprising:
generating a payment transaction authorization request message, said payment transaction authorization request message including said cryptogram; and
transmitting said payment transaction authorization request message for routing to said issuer.

17. The method of claim 16, further comprising:
receiving a response to said payment transaction authorization request message, said response originating from said issuer, said receiving of said response occurring after said displaying of said prompt.

18. The method of claim 17, wherein:
said commanding step is a first commanding step; and
the method further comprising:
in response to receiving said response, performing a second commanding step, said second commanding step for causing the IC payment card to perform a function in a case where said data signal path to said IC payment card is in existence at a time when the second commanding step is performed.

19. The method of claim 14, further comprising:
blocking a reply from said issuer from being transmitted to said IC payment card.

20. A POS (point of sale) device comprising:
a terminal component;
a reader component operatively coupled to the terminal component, the reader component including a contact interface for establishing a data signal path via conductive contact with an integrated circuit (IC) payment card;
a processor incorporated in the terminal component and/or the reader component;
a memory incorporated in the terminal component and/or the reader component, the memory in communication with the processor, the memory storing program instructions, the processor operative with the memory instructions to perform functions as follows:
initiating a payment transaction;
establishing said data signal path between said reader component and said IC payment card;

commanding the IC payment card to generate a cryptogram for verification by an issuer of the IC payment card, said commanding including supplying a place holder transaction amount to the IC payment card, the place holder transaction amount for being used in generating the cryptogram;

receiving the cryptogram from the IC payment card;

in response to receiving the cryptogram, issuing a command to disable contact reading operation by the reader component;

transmitting a transaction authorization request, the transaction authorization request including (a) the cryptogram, (b) the place holder transaction amount, and (c) a final transaction amount; and after issuing said command to disable, receiving a transaction authorization response message approving said payment transaction.

21. The POS device of claim 20, wherein said command issued in response to receiving the cryptogram is a command to deactivate the contact interface of the reader component.

22. The POS device of claim 20, wherein said command issued in response to receiving the cryptogram is a command to deactivate a card-reading software kernel associated with the POS device.

23. The POS device of claim 20, wherein the processor is further operative with the program instructions to perform a function as follows:

in response to receiving the cryptogram, displaying a prompt to a user instructing the user to remove the IC payment card from the reader component.

24. The POS device of claim 23, wherein said displaying is controlled by the terminal component.

25. The POS device of claim 23, wherein said displaying is controlled by the reader component.

* * * * *